(12) United States Patent
Nina Paravecino et al.

(10) Patent No.: US 12,717,631 B2
(45) Date of Patent: Aug. 25, 2026

(54) ASSIGNING WORKLOADS TO PHYSICAL RESOURCES IN SPATIAL ARCHITECTURES

(71) Applicant: Microsoft Technology Licensing, LLC, Redmond, WA (US)

(72) Inventors: Fanny Nina Paravecino, San Jose, CA (US); Michael Eric Davies, Cedar Rapids, IA (US); Abhishek Dilip Kulkarni, San Jose, CA (US); Md Aamir Raihan, Toronto (CA); Ankit More, San Mateo, CA (US); Aayush Ankit, Sunnyvale, CA (US); Torsten Hoefler, Pfaeffikon (SZ); Douglas Christopher Burger, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 646 days.

(21) Appl. No.: 18/174,599

(22) Filed: Feb. 24, 2023

(65) Prior Publication Data

US 2024/0303117 A1 Sep. 12, 2024

(51) Int. Cl.
*G06F 9/50* (2006.01)

(52) U.S. Cl.
CPC .................................. *G06F 9/5027* (2013.01)

(58) Field of Classification Search
CPC .. G06F 9/5072; G06F 11/3433; G06F 9/5027; G06F 2209/5019
See application file for complete search history.

(56) References Cited

U.S. PATENT DOCUMENTS

2019/0220321 A1* 7/2019 Yang ........................ G06F 9/505
2022/0198117 A1* 6/2022 Raumann .............. G06F 9/5011

OTHER PUBLICATIONS

Parashar, et al., "Timeloop: A Systematic Approach to DNN Accelerator Evaluation", In Proceedings of IEEE International Symposium on Performance Analysis of Systems and Software, Mar. 24, 2019, 12 Pages.
Eliad, et al., "Fine-tuning giant neural networks on commodity hardware with automatic pipeline model parallelism", USENIX Annual Technical Conference (USENIX ATC 21), Jul. 16, 2021, pp. 381-396.
International Search Report and Written Opinion received for PCT Application No. PCT/US2024/016412, Jun. 10, 2024, 12 pages.
International Preliminary Report on Patentability (Chapter I) received for PCT Application No. PCT/US2024/016412, Sep. 4, 2025, 08 pages.

* cited by examiner

*Primary Examiner* — Jorge A Chu Joy-Davila
(74) *Attorney, Agent, or Firm* — Barta Jones, PLLC

(57) ABSTRACT

Operations of a workload are assigned to physical resources of a physical device array. The workload includes a graph of operations to be performed on a physical device array. The graph of operations is partitioned into subgraphs. Partitioning includes at least minimizing the quantity of subgraphs and maximizing resource utilization per subgraph. A logical mapping of the subgraph to logical processing engine (PE) units is generated using features of the subgraph and tiling factors of the logical PE units. The logical mapping is assigned to physical PE units of the physical device array at least by minimizing network traffic across the physical PE units. The operations of the subgraph are performed using the physical PE units to which the logical mapping is assigned. This process enhances the computational efficiency of the array when executing the workload.

20 Claims, 7 Drawing Sheets

300

ASSIGNING WORKLOADS TO PHYSICAL RESOURCES IN SPATIAL ARCHITECTURES

BACKGROUND

Complex computing workloads, such as deep learning or other types of artificial intelligence (AI) workloads, present significant challenges with respect to organizing the performance of operations on available hardware resources. For any such workload and spatial architecture of hardware resources, constraints must be considered. For example, the work mapped to the array of available computing resources must be sized to fit the architecture of those resources. Further, the assignment of work to resources must consider bandwidth limitations between resources. Because of the size and complexity of AI workloads, organization and/or assignment of such workloads to computing resources while considering such constraints in a computationally efficient way is difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for assigning operations of a workload to physical resources of a physical device array is described. A workload is obtained that includes a graph of operations to be performed on a physical device array and the graph of operations is partitioned into subgraphs. Partitioning includes at least minimizing the quantity of subgraphs and maximizing resource utilization per subgraph. A logical mapping of the subgraph to logical processing engine (PE) units is then generated using features of the subgraph and tiling factors of the logical PE units. The logical mapping is assigned to physical PE units of the physical device array at least by minimizing network traffic across the physical PE units and the operations of the subgraph are performed using the physical PE units of the physical device array to which the logical mapping is assigned.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
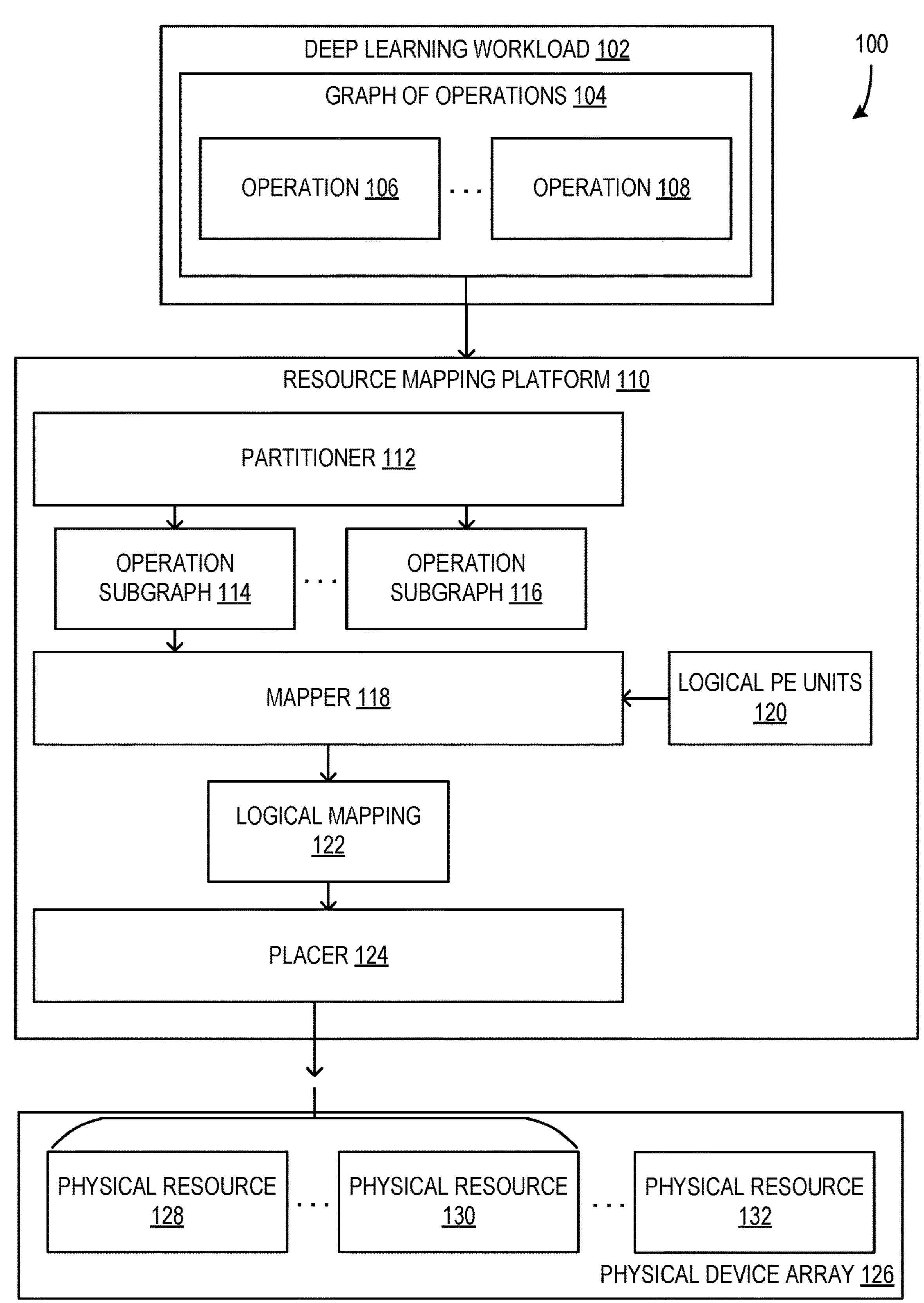
FIG. 1 is a block diagram illustrating a system configured for assigning operations of a workload to resources of a physical device array.

A computerized method and system assign operations of a workload to physical resources of a physical device array (e.g., a spatial architecture device), and then perform the assigned operations. A workload that includes a graph of operations is obtained. In some examples, the graph of operations is a series, group, or set of operations in which some operations depend on the completion of other operations, such that the group of operations can be expressed as a graph in which the nodes of the graph represent operations and the edges of the graph represent dependencies between operations. The graph is partitioned into a set of subgraphs by minimizing the quantity of subgraphs and maximizing resource utilization per subgraph. Each subgraph includes a continuous group of operations of the graph of operations (where continuous means that two subgraphs cannot include intermediate nodes that belong to another subgraph). Further, in some examples, each subgraph is sized to be executed on a set of processing elements or processing engine (PE) units of the device array. A logical mapping of a subgraph to logical PE units associated with a logical structure of the physical device array is generated using features of the subgraph. Example features include the structure of edges between operation nodes, and tiling factors of the logical PE units. The tiling factors represent ways that operations of the subgraph can be divided among available resources. The logical mapping of the subgraph is assigned to physical PE units of the physical device array, wherein the assignments are optimized to minimize network traffic across the physical PE units. The operations of the subgraph are performed using the physical PE units of the physical device array to which the logical mapping is assigned.

The disclosure operates in an unconventional manner at least by automatically analyzing the structures of a workload and the physical device array upon which the workload will be executed to achieve a computationally efficient operation assignment at a wide variety of complexities and scales. In an example, only two inputs are needed: an AI workload and spatial architecture of the physical device array to be used. Example operations include the partitioning of the operation graph of the workload into subgraphs that are sized to leverage resources of a single device, the mapping of each subgraph to logical PE units with respective connections using spatial, temporal, and/or internal tiling of operations/resources, and the placement or assignment of the logical mapping to physical PE units and/or other physical resources, such as by using Integer Linear Programming (ILP)-based formulations. The described placement or assignment process optimizes the search space to minimize the network traffic across physical resources and generates the assignments of operations to physical resources on each device.

In an example, the disclosure determines efficient assignments of operations of the workload in a computationally efficient and time efficient way by separating three major concerns of the spatial mapping problem (e.g., partitioning the workload into tractable subparts, mapping operations to logical structures, and assigning logical mappings to physical resources) into orthogonal sub-problems that can be considered independently first, and then composed and iterated over to improve the overall quality of results.

Further, the disclosure describes use of a graph profile of a graph of operations, which provides additional context and/or feature information associated with the graph and the operations therein. In some examples, the graph profile includes memory requirements of operations, PE requirements of operations, and/or other requirements or constraints of operations within the graph. The data of this profile is used by various stages of the disclosure to enable accurate, efficient use of the physical resources of a device array in performing the operations of the graph.

The disclosure provides a method and system for assignment of workloads to physical resources that can be scaled out without major changes. Thus, the disclosure can flexibly be used in a wide variety of situations with workloads and physical device arrays of different sizes and structures.

Other approaches that use manual mapping are slow and error-prone processes. In comparison, the disclosure performs such mapping tasks quickly and automatically, and the results produced by the disclosure are more computationally efficient mappings that make better use of the available physical resources and enable the performance of workloads in shorter times.

The partitioner of the disclosure decouples the latter two stages of the described process by partitioning the operation graph of the workload into a minimum number of contiguous subgraphs that satisfy all hardware constraints of the physical device array. These subgraphs can then be individually mapped to single or multiple PEs wherein each subgraph is mapped to a single spatial architecture device or a single device array, resulting in a set of smaller, less complex problems to solve when compared to the problem of mapping the entire workload to the set of resources of the physical device array.

The mapper of the disclosure is configured to use an Einstein Summation (Einsum) notation that provides a convenient, compact notation in which to express the computation of typical neural network operations. The use of such a notation naturally lends itself to a search space for temporal and spatial tiling factors and the ordering for dimensions involved in the operation space.

The placer of the disclosure is configured to use a set of placement or assignment strategies for improving ILP-based assignment, thus enabling a robust and domain-agnostic approach to mapping large-scale problems in a practical amount of time. Further, these strategies also provide many tunable parameters that can be adjusted for improved result quality or improved solve-time. This increases the flexibility of the disclosure with respect to how it can be configured to operate by users. For example, the user can configure the disclosed system to provide solutions in faster times or provide higher quality solutions in slower times.

FIG. 1 is a block diagram illustrating a system 100 configured for assigning operations 106-108 of a workload 102 to resources 128-132 of a physical device array 126. In some examples, a graph 104 of operations of workload 102 is provided to a resource mapping platform 110. The resource mapping platform 110 is configured to partition graph 104 of operations into operation subgraphs 114-116 using a partitioner 112, generate a logical mapping 122 of each operation subgraph 114 based on logical Processing Engine (PE) units 120 using a mapper 118, and assign logical mappings 122 to physical resources 128-132 of physical device array 126 as described herein.

Further, in some examples, system 100 includes one or more computing devices (e.g., the computing apparatus of FIG. 7) that are configured to communicate with each other via one or more communication networks (e.g., an intranet, the Internet, a cellular network, other wireless network, other wired network, or the like). In some examples, entities of system 100 are configured to be distributed between the multiple computing devices and to communicate with each other via network connections. In an example, resource mapping platform 110 is located and/or executed on a first computing device while physical device array 126 occupies a single spatial architecture device or a multi-device system. Resource mapping platform 110 and/or the single device or multiple devices of the physical device array 126 are then configured to communicate with each other via network connections as described herein.

In some examples, workload 102 is a deep learning workload associated with a machine learning process. Workload 102 includes a plurality of operations 106-108 that are performed to train, infer with, and/or otherwise interact with a machine learning model. For example, the workload 102 is a training workload such that the machine learning model is trained to perform a task, such as classification of input data into one or more possible classes. In another example, the workload 102 is an inference workload. Operations 106-108 are part of a graph 104 which is a structure that represents at least some dependencies between various operations 106-108. For example, if operation 108 requires that operation 106 be completed first, then operation 108 depends on operation 106 and that dependency is reflected in graph 104 structure of deep learning workload 102. In some such examples, this dependency structure data is used by resource mapping platform 110 to generate accurate, efficient resource assignments of operations 106-108. Further, in some examples, the operations 106-108 of deep learning workload 102 include operations such as matrix multiplication operations, SoftMax operations, concatenation operations, or any other types of operations that are useful during deep learning processes without departing from the description.

Partitioner 112 of resource mapping platform 110 includes hardware, firmware, and/or software configured for generating a plurality of operation subgraphs 114-116 when given workload 102 in the form of a graph 104 of operations. In some examples, partitioner 112 generates subgraphs 114-116 in such a way that each subgraph 114-116 is structured to be executed on a single device of physical device array 126. Further, in some examples, partitioner 112 is configured to optimize operation subgraphs 114-116 for memory usage and/or latency when the associated operations are later performed on physical device array 126. For example, partitioner 112 is configured to optimize for memory usage by preferring to use small edges of graph 104 as boundaries between subgraphs 114-116 and/or to optimize for latency by grouping as many operations together as possible while still ensuring that each subgraph 114-116 can be executed on a single device. Further, determining how to define partition boundaries is based on the memory footprint (e.g., storage of intermediate tensors in high bandwidth memory (HBM) within a subgraph) such that, if the subgraph surpasses a current capacity of memory, then a partition is needed. Partitioner 112 is described in greater detail below at least with respect to FIGS. 2 and 3.

Mapper 118 of resource mapping platform 110 includes hardware, firmware, and/or software configured for generating a logical mapping 122 for each operation subgraph 114-116 when given logical PE units 120 associated with the resources of physical device array 126. In some examples, mapper 118 is configured to identify tiling strategies that are possible and/or needed with respect to the temporal, spatial, and/or internal constraints of operations of a subgraph. The output of mapper 118 captures logical PE units 120 assigned to specific operations of the subgraph, respective connections across PE units 120, and requirements for communication between those PE units 120 when performing the assigned operations. Mapper 118 is described in greater detail below at least with respect to FIGS. 2 and 4.

In some examples, logical PE units 120 are logical representations of one or more processors and/or other computing resources of physical device array 126. A logical PE unit 120 is a representation of one or more computing resources that are configured to be used to perform an operation or several closely related operations. Further, in some examples, a logical PE unit 120 is configured to represent multiple resources that are closely related and that can communicate with each other with little or no substantial latency, such that logical PE unit 120 can be treated as a single entity for the purpose of mapping operations of a subgraph 114-116 to that logical PE unit 120. Further, it should be understood that, in some examples, a logical PE unit 120 is configured to perform processing tasks of workload 102 and unit 120 differs from other logical resource that perform other tasks, such as resource management tasks.

Placer 124 of resource mapping platform 110 includes hardware, firmware, and/or software configured for assigning logical mappings 122 of subgraphs 114-116 to physical resources 128-130 of physical device array 126. In some examples, placer 124 uses the information in logical mapping 122 to assign and/or schedule the performance of operations and related instructions on physical resources 128-130 as described herein. Further, in some examples, placer 124 is configured to generate output data that captures the low-level instructions that should be executed on each physical PE unit and associated communications pathways (e.g., represented by the physical resources 128-132) of physical device array 126. Placer 124 is described in greater detail below at least with respect to FIGS. 2 and 5.

Physical device array 126 includes a plurality of computing devices that are configured for executing operations such as operations 106-108 of deep learning workload 102. In some examples, physical resources 128-132 of physical device array 126 include physical PE units, computing devices, and/or components of those computing devices. Further, in some examples, physical resources 128-132 include components of array 126 that enable the operation of and/or communication of the computing devices, such as routers or other devices that enable communication between computing devices. Additionally, or alternatively, physical resources 128-132 include components within computing devices, such as individual processors, sets of processors, memory, data storage components, or the like. In some examples, one or more physical resources 128-132 are included in and/or used by a physical PE unit to which operations 106-108 of a subgraph 114-116 are assigned by placer 124. A physical PE unit is a representation of a set of such physical resources that are configured to operate in concert to perform workload operations as described herein.

In some examples, logical mapping 122 of a subgraph 114-116 is assigned to a subset of physical resources 128-130 of physical device array 126 that are all associated with one computing device. In such examples, partitioner 112 is configured to divide graph 104 of operations of workload 102 into subgraphs 114-116 in such a way that each subgraph 114-116 can be executed on a single computing device. This enables the operations within a subgraph to be performed in an efficient way, as communications and other interactions between operations on the same computing device tend to be much faster than communications and other interactions between operations on different devices.

It should be understood that, while only one logical mapping 122 is illustrated in FIG. 1, in other examples, mapper 118 is configured to generate a logical mapping 122 for each operation subgraph 114-116. Further, each of those logical mappings 122 is assigned to subsets of physical resources of array 126, such as the subset of physical resources 128-130. In some examples, the assignment of resources to logical mappings 122 includes assigning each logical mapping 122 to different subsets of physical resources and/or assigning some logical mappings 122 to use some physical resources at different times than other logical mappings 122. In this way, placer 124 is configured to manage the physical resources of the physical device array 126 both spatially and temporally.

Figure 2:
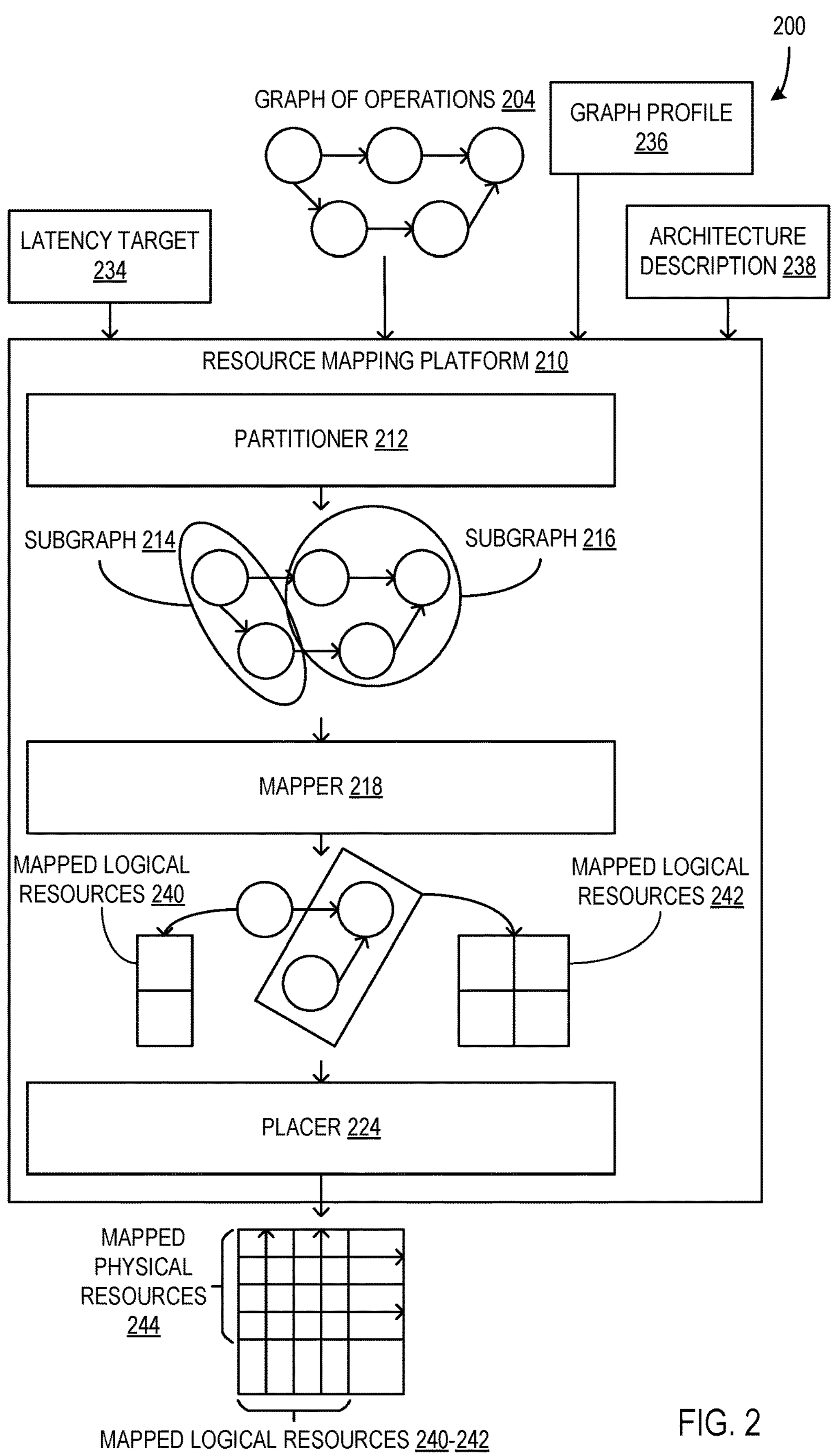
FIG. 2 is a block diagram illustrating a system configured for mapping operations of a subgraph of a workload to physical resources.

FIG. 2 is a block diagram illustrating a system 200 configured for mapping operations (e.g., operations 106-108) of a subgraph 216 of a workload (e.g., workload 102) to physical resources 244. In some examples, system 200 is configured to operate in substantially the same way as system 100 of FIG. 1 as described above. Graph 204 of operations is provided to the resource mapping platform 210. Partitioner 212 partitions graph 204 into subgraphs 214-216 and each subgraph is provided to mapper 218. Mapper 218 maps the operations of a subgraph 216 to logical resources 240 and 242. Placer 224 then uses those mapped logical resources 240) and 242 to map operations to physical resources 244.

As illustrated, the operations are represented by circles, or nodes, and the graph structure is represented by arrows, or directed edges, between circles. As previously described, the arrows represent dependencies between operations, such that an arrow pointing from a first circle to a second circle indicates that the second operation is dependent on the first operation (e.g., the second operation uses the output of the first operation as input). Further, the different subgraphs 214 and 216 are represented by ovals or circles around groups of operations in the graph 204, where links or dependencies between subgraphs are represented by the arrows that cross the boundaries formed by the ovals or circles.

Logical resources 240 and 242 (e.g., logical PE units 120) mapped by mapper 218 are represented by sets of squares, wherein each operation or group of operations of the subgraph are mapped to a set of logical resources based on the requirements and/or constraints of those operations and the features of the logical resources to which those operations are mapped. Further, mapped logical resources 240-242 using squares occupied by vertical arrows are depicted as being mapped onto mapped physical resources 244 by placer 224 using squares occupied by horizontal arrows crossing those vertical arrows.

In some examples, resource mapping platform 210 receives input other than graph 204 of operations that is used during the resource assignment/mapping process. A latency target 234 is provided to guide resource mapping platform 210 to prioritize lower latency resource usage where possible. For example, subgraphs 214-216 are selected from graph 204 in a way that reduces or minimizes latency between operations of the subgraphs and/or latency of interactions between subgraphs.

Further, a graph profile 236 of graph 204 of operations is provided, which provides additional context and/or feature information associated with graph 204 and the operations therein. In some examples, graph profile 236 includes memory requirements of operations (e.g., the quantity of memory required for an operation, including parameters and input/output activations), PE requirements of operations (e.g., the quantity of processing elements required to perform a particular operation), and/or other requirements or constraints of operations within graph 204 (e.g., bandwidth constraints, graph continuity constraints, or the like). Examples of such constraints and requirements are described in greater detail below at least with respect to FIG. 3. The data of this profile 236 is used by partitioner 212, mapper 218, and/or placer 224 to enable accurate, efficient use of the physical resources of a device array such as array 126 in performing the operations of graph 204.

Additionally, or alternatively, an architecture description 238 is provided to resource mapping platform 210 which includes information and/or data that describes features of the physical device array that will be used to perform the operations of graph 204. In some examples, architecture description 238 includes data such a quantity of available PEs, data describing the topology and/or structure of the array, and/or data describing bandwidth and/or other features of links between PEs or other resources of the array. The data of architecture description 238 is used by partitioner 212, mapper 218, and/or placer 224 to further enable accurate, efficient use of the physical resources of a device array such as array 126 in performing the operations of graph 204.

Figure 3:
FIG. 3 is a block diagram illustrating a set of subgraph partitions of a workload as partitioned by a partitioner.
Figure 3:
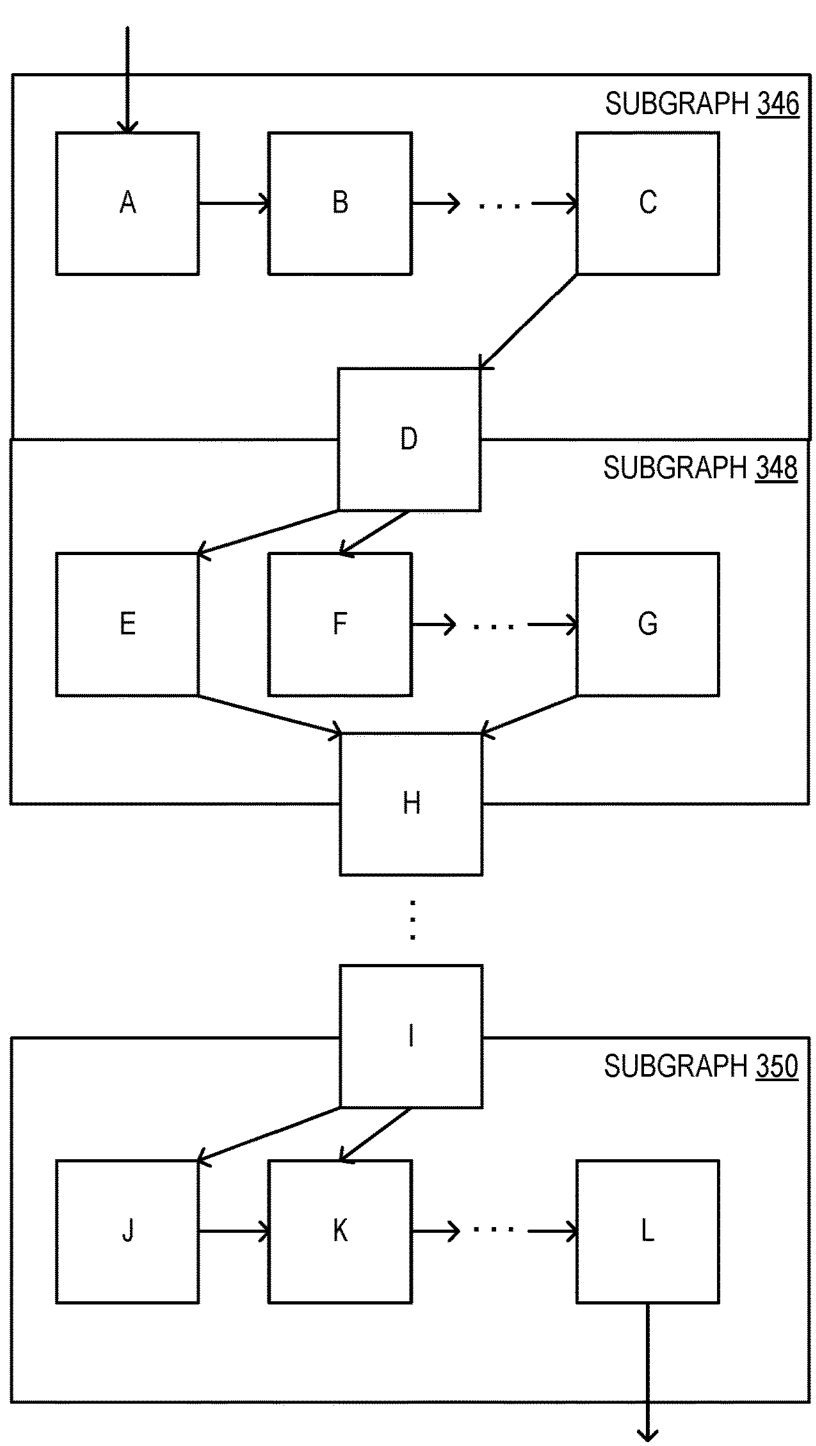

FIG. 3 is a block diagram illustrating a set 300 of subgraph partitions 346-350 of a workload (e.g., a deep learning workload 102) as partitioned by a partitioner (e.g., a partitioner 112 or 212). In some examples, subgraphs 346-350 are identified or determined in a system such as system 100 of FIG. 1 or system 200 of FIG. 2 as described herein.

Subgraph 346 includes a plurality of operations labeled A, B, and C. The operations are linked by arrows which represent dependencies between the operations as described above. For example, operation B depends on operation A, while operation C depends on another operation in subgraph 346 and indirectly depends on operation B based on the links on either end of the ellipse.

Operation D represents an operation on or near the boundary of subgraph 346 and subgraph 348. In some examples, the operation D is performed as part of either subgraph 346 or subgraph 348. In some examples, the determination of which subgraph operation D is part of is based on the requirements and constraints of operation D. For example, as illustrated, operations E and F depend directly on operation D, so operation D is treated as part of subgraph 348 to minimize the quantity of links that cross the boundary between subgraph 346 and subgraph 348 (the links may represent required communication or interaction between operations, which is slower when it occurs between multiple computing devices).

Similarly, subgraph 348 includes operations E, F, and G and operation H on the boundary between subgraph 348 and the next subgraph while subgraph 350 includes operations J. K, and L and operation I on the boundary between subgraph 350 and the previous subgraph. It should be understood that, in other examples, the set of subgraphs 346-350 includes more, fewer, or different subgraphs and those subgraphs includes more, fewer, or different operations without departing from the description.

In some examples, partitioner 112 and/or 212 is configured to take in graph 104 and/or 204 of operations and profile 236 information about the graph to produce subgraphs 346-350. The partitioner determines where to place boundaries between subgraphs in the graph such that each subgraph can be placed as a single instance on a spatially programmed accelerator processor or other similar physical resource (e.g., physical resources 128-132). In some examples, the partitioner uses ILP to determine subgraphs 346-350 using variables, constants, and constraints of the workload graph and the available resources of associated physical device array 126. The partitioner ILP objective functions are configured to minimize the quantity of subgraphs and maximize the resource utilization per subgraph. Additionally, or alternatively, the partitioner is configured to use memory usage as the major constraint when determining subgraph boundaries.

For example, the constants used by the partitioner 112 include the set of operation or operator nodes in the graph, the set of directed edges in the graph representing dependencies of the operators, an upper boundary on the quantity of subgraph in to which the graph is partitioned, a total memory capacity, a total bandwidth capacity, and a total quantity of processing elements available. In other examples, more, fewer, or different constants are used by the partitioner 112 without departing from the description.

Additionally, or alternatively, in an example, the variables used by the partitioner 112 include variables indicating whether nodes should be included in subgraphs, variables indicating memory requirements for nodes, variables indicating quantities processing elements required for nodes, variables indicating whether nodes communicate out of subgraphs to which they are assigned, variables indicating quantities of nodes allocated to subgraphs, variables indicating whether subgraphs are empty, and variables indicating quantities of empty subgraphs. In other examples, more, fewer, or different variables are used by the partitioner 112 without departing from the description.

Further, in an example, the constraints used by the partitioner 112 include a constraint requiring that every node be assigned to one and only one subgraph, a constraint that each subgraph be continuous, a constraint that the sum of required PEs of all nodes in each subgraph be less than a total quantity of PEs, a constraint that the sum of required memory of all nodes in each subgraph be less than a total quantity of memory, and a constraint that sum of bandwidth usage of all nodes in each subgraph be less than a total bandwidth capacity. In other examples, more, fewer, or different constraints are used by the partitioner 112 without departing from the description.

In some such examples, the partitioner 112 uses expressions populated with constants, variables, and/or constraints to determine how to partition the graph into subgraphs while meeting any constraints. Further, some such expressions are maximized or minimized during the partitioning to support the efficiency of the performance of the workload (e.g., maximizing the quantity of empty subgraphs as described below with respect to Tables 1, 2, and 3 and the associated expressions).

Table 1, below, includes exemplary constants of a workload graph and a physical device array that are used by the partitioner for determining subgraphs. These constants are further used to formulate and/or describe associated variables and/or constraints in Tables 2 and 3 that are also described below.

TABLE 1

| Constant | Description |
|---|---|
| V | The set of nodes in the graph (referred to as "vertex") |
| E | The set of directed edges in the graph (referred to as "edges") |
| K | Upper bound on quantity of subgraphs |
| M | Total L2 memory capacity |
| B | Bandwidth capacity |
| $N_{AIE}$ | Total quantities of PEs |

Table 2, below, includes exemplary variables of a workload graph and a physical device array that are used by the partitioner for determining subgraphs. These variables are used in combination with the constants of Table 1, above, to formulate and/or otherwise describe the constraints of Table 3, below.

TABLE 2

| Variable | Description |
|---|---|
| $x_{vi}$ | Binary variable denoting whether a node v should be placed on subgraph i |
| $m_v$ | Memory requirements for node v including parameters and input/output activations |
| $p_v$ | Number of PEs required for node v |
| $CommOut_{ui}$ | Binary variable that is '1' if u is in subgraph i, but has an edge going out of the subgraph i |
| $numNode_i$ | Variable that denotes quantity of nodes allocated to subgraph i |
| $Nonempty_i$ | Variable that denotes whether the subgraph i is non-empty |
| numEmptyPartition | Variable that denotes a total quantity of empty partitions/subgraphs |

Table 3, below, includes exemplary constraints and associated formulas that are used by the partitioner for determining subgraphs. The constraints include requirements that every vertex be assigned to one subgraph, that each subgraph is continuous, constraints related to PEs, constraints related to memory, and constraints related to bandwidth. In other examples, more, fewer, or different constraints are used without departing from the description.

The formula of the first constraint, that every vertex be assigned to one subgraph, indicates that, for all vertices v, the sum of all xvi variables for all subgraphs i is equal to 1. This means that exactly one xvi variable is set to 1 for each vertex v, such that each vertex v is in one subgraph i.

The formula for the second constraint, that each subgraph is continuous, indicates that the vertices of each subgraph are continuous, such that all vertices of the subgraph are connected via edges to other vertices of the subgraph except for the edge that enters the subgraph and the edge that leaves the subgraph. Alternatively, or additionally, continuous is defined such that two subgraphs cannot include intermediate nodes that belong to another subgraph. For instance, given continuous subgraphs A, B, and C, there is not subgraph A' that encompasses A and C because B is between A and C. It should be understood that, in most examples, the workload graph is a directed, acyclic graph (DAG).

The formula for the third constraint associated with PEs indicates that, for all subgraphs i, the sum of the quantities of PEs $p_v$ required for each vertex v in the subgraph i is less than or equal to the total quantity of PEs $N_{AIE}$.

The formula for the fourth constraint associated with memory indicates that, for all subgraphs i, the sum of the memory $m_v$ required for each vertex v in the subgraph i is less than or equal to the total quantity of memory M.

The formula for the fifth constraint associated with bandwidth indicates that, for all subgraphs i, the sum of the communication cost CommCost[v] for each vertex v in the subgraph i that has an edge exiting the subgraph i is less than or equal to the total bandwidth capacity B.

TABLE 3

| Constraint | Formula |
|---|---|
| Every vertex assigned to one subgraph | $\forall v. \sum_i x_{vi} = 1$ |
| Graph continuity condition | $\forall v$ Subgraph $\{v \in V: x_{vi} = 1\}$ is contiguous<br>$\forall v, \forall i.\ z_{vi} \geq x_{vi}$<br>$\forall (u, v) \in E, \forall i.\ z_{vi} \leq z_{ui}$<br>$z_{vi} \leq x_{vi} - x_{ui} + 1$ |
| PE Constraints | $\forall i. \sum_v x_{vi} p_v \leq N_{AIE}$ |
| Memory Constraints | $\forall i. \sum_v x_{vi} m_v \leq M$ |
| Bandwidth Constraints | $\forall (u, v) \in E, \forall i.\ CommOut_{ui}\ S\ x_{ui} - x_{vi}$<br>$\forall i. \sum_v CommCost[v] * CommOut_{vi} \leq B$ |

In some examples, using the above constants, variables, and constraints, the partitioner is configured to use optimization constraints that minimize the total quantity of subgraphs, or maximize the quantity of empty subgraphs. If the number of vertices or nodes of a subgraph (see Expression 1, below) is less than 1, that subgraph is considered "empty" (see Expression 2, below). The partitioner is configured to count the number of empty subgraphs (see Expression 3, below) and to partition the operations of the input graph in such a way that the number of empty subgraphs is maximized (see Expression 4, below). These optimization constraints are illustrated below in the following expressions. It should be understood that the left side of Expression 2 is a non-linear expression and the right side of Expression 2 is a linear expression to which that non-linear expression is converted for use in the described optimization processes.

$$\forall i \cdot numNode_i = \sum_v x_{vi} \tag{1}$$

$$\forall i \cdot empty_i = numNode_i < 1 \rightarrow \forall i \cdot empty_i \leq 1 - \frac{numNode_i}{len(V)} \tag{2}$$

-continued $$numEmptySubgraph = \forall\, i \cdot \sum_i empty_i \tag{3}$$

$$\text{Maximize}(numEmptySubgraph) \tag{4}$$

Figure 4:
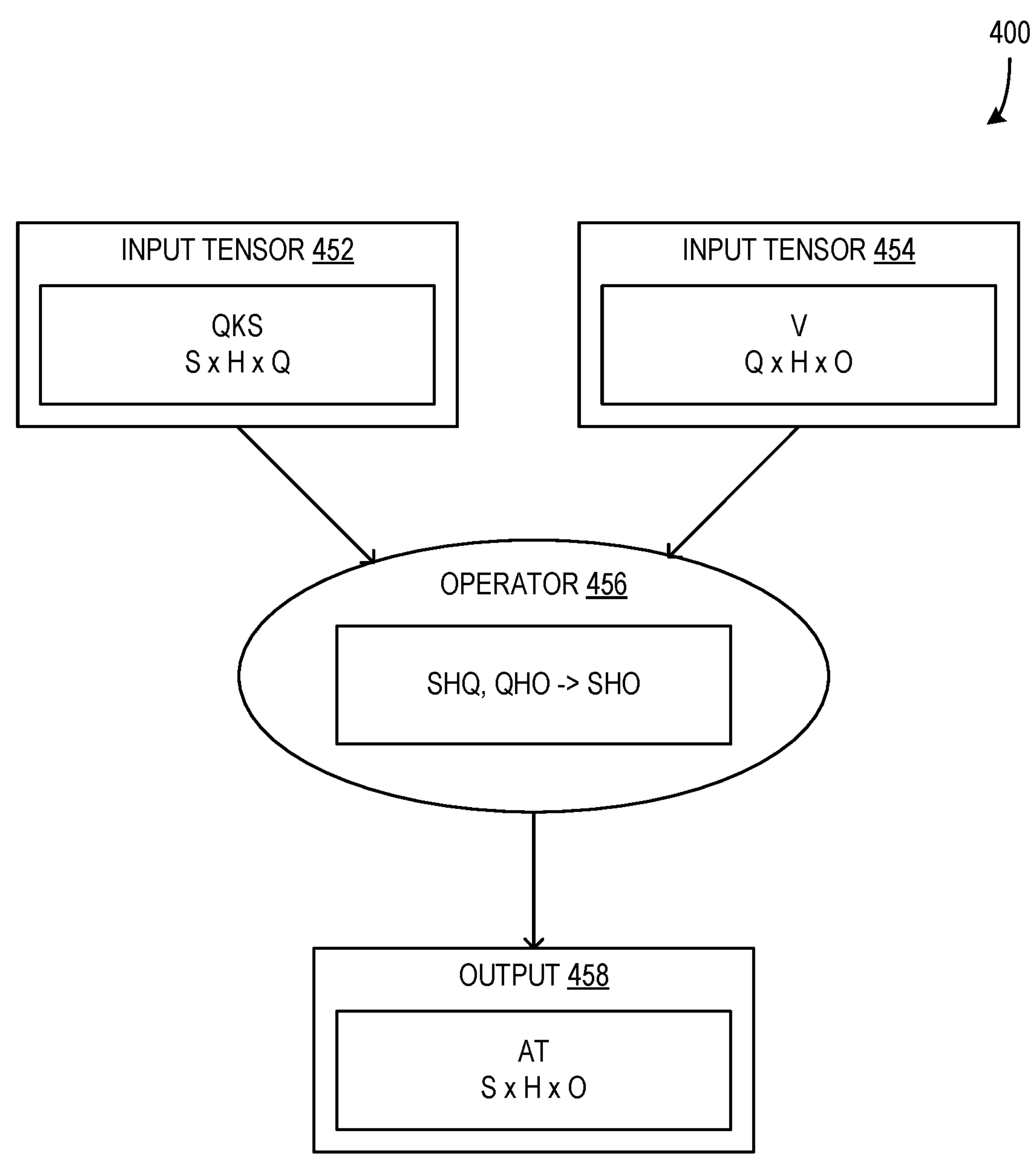
FIG. 4 is a block diagram illustrating an operation arranged according to an Einstein Summation (Einsum) notation as used by a mapper.

FIG. 4 is a block diagram illustrating an operation 400 arranged according to an Einstein Summation (Einsum) notation as used by a mapper (e.g., mapper 118 or 218). In some examples, operation 400 is an operation of a subgraph (e.g., subgraph 114) that is mapped to a logical PE or other resource (e.g., logical resource 240) in a system such as systems 100 and 200 of FIGS. 1 and 2, respectively.

Further, in some examples, mapper 118 is configured to analyze operations and/or associated operators, such as operator 456, and tiling factors for the operation space are produced, where tiling factors are possible block sizes of data that can be used when mapping operator 456 to logical PE units. As illustrated, such operations 400 are represented using an Einsum notation in some such examples. The described Einsum notation and/or other similar summation notations are used to analyze constraints of groups of operators to determine whether such groups can be mapped to the same PEs. After this analysis, a tiling factor is selected from a set of possible tiling factors that satisfy the analyzed constraints of the groups of operators. Additionally, each operator in the workload is assumed to be representable by an affine loop nest of arbitrary dimensionality. The tiling factors and order of this loop nest contain all the information needed to determine the quantity of data that must be held within one PE's memory, the size of the computation over this data, and the frequency at which new data must be read in from each input tensor (e.g., input tensors 452 and 454). The mapper 118 is configured to collapse such a loop nest into the illustrated Einsum notation, which is sometimes augmented with notation for additional operations beyond matrix multiplication. Additionally, the notation enables the specification of "barrier" dimensions to denote when a dimension must be read entirely before computation can begin. This notation enables sufficient description of all the operations in a typical deep learning model in a layout-agnostic way.

An operator 456 in Einsum notation can be defined as follows. The EinsumString describes the operator itself, the BarrierDimension defines dimensions of the operator that must be read before computation, the InputTensorList is a list of input tensors to the operator, the OutputTensor defines the output tensor of the operator, and the OperatorType indicates the type of the operator (e.g., Matrix Multiplication, Concatenation, or the like).

Operator = Operator_from_einsum(*EinsumString*, *BarrierDimension*, *InputTensorList*, *OutputTensor*, *OperatorType*)

As illustrated, the EinsumString of operator 456 is "SHQ, QHO→SHO", the BarrierDimension is 'Q', the InputTensorList includes input tensors 452 and 454, 'QKS' and 'V', respectively, and the OutputTensor is output 458, or 'AT'. The OperatorType of operator 456 is MATMUL, indicating that it is a matrix multiplication operator.

Using the operators in Einsum notation, mapper 118 is configured to search over valid assignments of tiling factors for each of the dimensions involved in the associated operations. In some examples, properties of the operation, source tensors, and/or hardware resources are used as constraints on the search for tiling factors of a given dimension. Mapper 118 is configured to use those constraints to reduce the set of possible tiling factors for operators in a subgraph being analyzed. Tiling factors associated with the operations/operators of the subgraph are then selected from that reduced set of possible tiling factors.

In some examples, the output of mapper 118, logical mapping 122, includes the augmented Einsum notations with bound tiling factors for each operation. These tiling factors directly translate to logical layout of PEs, called a logical graph, which is used to perform a given computation. A logical graph is created for each operator individually and the set of logical graphs makes up logical mapping 122, which is provided to placer 124 as described herein.

Further, in some examples, mapper 118 is configured to identify multiple operations/operators of a subgraph that can be fused or otherwise combined for more computationally efficient execution. In some such examples, the generation of logical mapping 122 includes identifying those operators that can be fused to take advantage of such improvements and including the resulting fused operators as part of logical mapping 122, which can then be assigned to physical resources as described herein.

Figure 5:
FIG. 5 is a block diagram illustrating the assignment of a logical mapping of a subgraph to physical resources by a placer.
Figure 5:
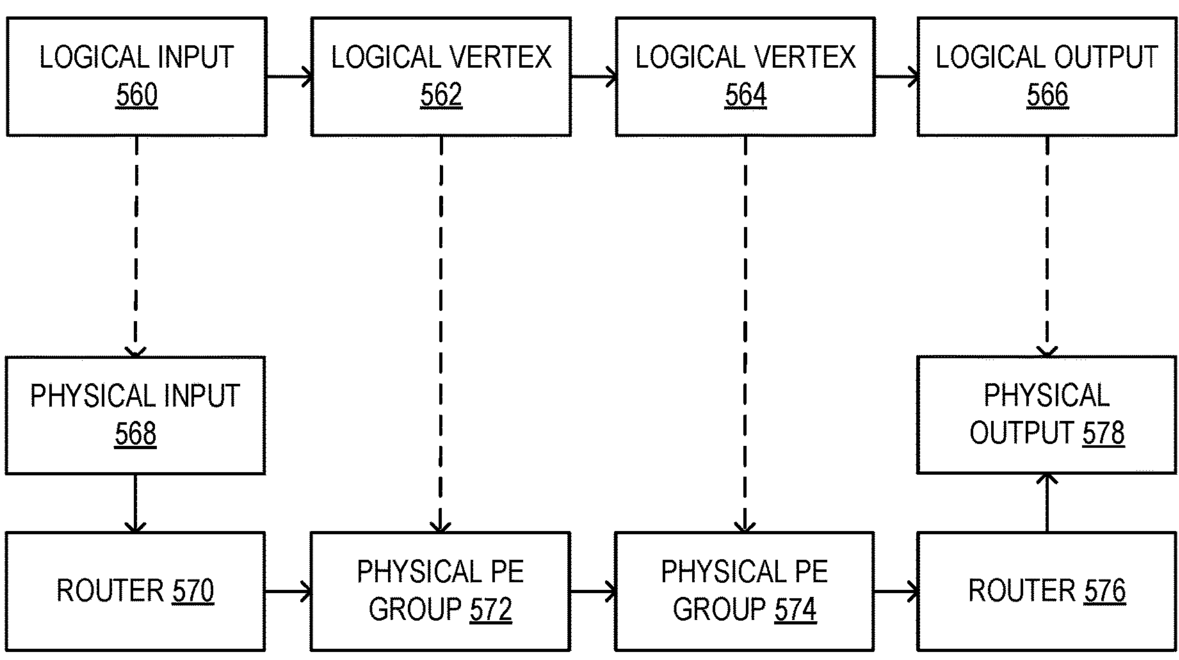

FIG. 5 is a block diagram 500 illustrating the assignment of a logical mapping (e.g., logical mapping 122) of a subgraph (e.g., subgraph 114) to physical resources (e.g., physical resources 128-130 or physical resource 244) by a placer (e.g., placer 124 or 224). In some examples, placer 124 is configured to assign the logical objects of a logically mapped subgraph to locations on the physical array in such a way that hardware constraints of the physical array are respected (e.g., bandwidth constraints, routing table capacity constraints, and link availability constraints). Further, in some such examples, placer 124 is configured to use an ILP-based approach that formulates placement as a graph embedding problem. The assignment of logical objects to corresponding physical resources illustrates this task. Additionally, in some examples, placer 124 is configured to minimize or otherwise optimize network traffic across PEs using a hop-byte metric, which measures the bytes that traverse different paths based on numbers of hops between physical resources.

As illustrated, placer 124 assigns logical input 560 to physical input 568, logical vertex 562 to the physical PE group or set 572, logical vertex 564 to the physical PE group or set 574, and logical output 566 to physical output 578. The physical resources further include routers 570) and 576 that are configured to route data from physical input 568 to physical PE group 572 and to route data from physical PE group 574 to physical output 578, respectively. It should be understood that, in other examples, more, fewer, or different logical components are assigned to more, fewer, or different physical resources without departing from the description. Further, it should be understood that, in some examples, the logical components are assigned to the physical resources based on constants, variables, and/or constraints as described herein.

For example, the constants used by the placer 124 include the set of logical PEs in the logical input, the set of logical edges in the logical input, the set of logical links in the logical input, the connectivity matrix encoding of the logical input, the set of logical reduction chains, the set of physical PEs, the set of physical input nodes, the set of physical output nodes, the set of physical routers, the set of physical links, the capacities of the physical links, the logical link limits of the physical links, and the set of physical cascade links. In other examples, more, fewer, or different constants are used by the placer 124 without departing from the description.

Additionally, or alternatively, in an example, the variables used by the placer 124 include encodings of whether a logical node is mapped to a target physical node, mappings from logical inputs to physical inputs, mappings from logical outputs to physical outputs, mappings from logical edges to physical links, mappings from logical links to physical links, and mappings from logical fast links to physical fast links. In other examples, more, fewer, or different variables are used by the placer 124 without departing from the description.

Further, in an example, the constraints used by the placer 124 include a constraint requiring that logical vertices be mapped to target nodes one-to-one, a constraint requiring that logical inputs be mapped to physical inputs many-to-one, a constraint requiring that logical outputs be mapped to physical outputs many-to-one, a constraint requiring that logical cascade links be mapped to physical cascade links one-to-one, a constraint requiring that outgoing logical links are mapped to exactly one output link from a corresponding physical node or a corresponding physical input, a constraint requiring that logical links with destinations mapped to physical nodes use one hardware link to enter the physical nodes, a constraint requiring that logical links with destinations mapped to physical outputs use one hardware link to enter the physical outputs, a constraint requiring that logical links that enter a router by a physical link must also leave by exactly one physical link, a constraint requiring that logical edges are mapped to physical links if one or more of its logical links are mapped to the physical links, a constraint requiring that the sum of bandwidth needed by edges routing through a link do not exceed capacity of the link, a constraint requiring that the sum of the number of links mapped to a physical link does not exceed its limit, a constraint requiring that logical cascade links mapped to physical cascade links must include the sources of the physical cascade links in their possible sources, and a constraint requiring logical cascade links mapped to physical cascade links must include the destinations of the physical cascade links in their possible destinations. In other examples, more, fewer, or different constraints are used by the placer 124 without departing from the description.

In some such examples, the placer 124 uses optimizing functions populated with constants, variables, and/or constraints to determine how to place the logical mappings onto physical resources while meeting any constraints. For instance, in some examples, optimizing function optimize for performance metrics, such as minimizing network latency. Other examples are explained in greater detail below.

Table 4, below; includes exemplary constants of a logical mapping of a subgraph and a physical device array that are used by placer 124 for assigning operations to the physical resources. These constants are used to further formulate and/or define the variables and constraints of Tables 5 and 6, respectively.

TABLE 4

| Constant | Description |
|---|---|
| V | The set of logical PEs (Referred to as "vertex") |
| E | The set of logical edges (each edge is single-source-many-destination) |
| F | The set of logical links (each link is a single destination for an edge) |
| I | The set of logical input nodes |
| O | The set of logical output nodes |
| $G = (V \cup F \cup I \cup O)^2$ | Connectivity matrix encoding the logical graph |
| $C = \{\{v_i\}\}$ | The set of logical reduction chains (chains are sets of vertices) |
| S(C, V) | This defines which logical PE is the sink for chain C |
| N | Set of physical PE units (referred to as "nodes") |
| J | Set of physical input nodes |
| P | Set of physical output nodes |
| R | Set of physical Routers |
| L | Set of physical Links |
| Cap | Mapping of physical links to their capacity |
| Lim | Mapping of physical links to their limit of the number of logical links |
| X | Set of physical cascade links |
| $H = (N \cup J \cup P \cup R \cup L \cup X)_2$ | Connectivity matrix encoding the physical hardware connectivity |

Table 5, below, includes exemplary variables of a logical mapping of a subgraph and a physical device array that are used by the placer 124 for assigning operations to the physical resources. The constants of Table 4 are used in the definition of these variables and, further, these variables are used to formulate and/or otherwise define the constraints of Table 6, below.

TABLE 5

| Variable | Description |
|---|---|
| $M_{vn}(V, N)$ | 1:1 Binary matrix encoding of whether a logical vertex v is mapped to a target physical node n |
| $M_{ij}(I, J)$ | *:1 Mapping from logical inputs to physical inputs |
| $M_{op}(O, P)$ | *:1 Mapping from logical outputs to physical outputs |
| $M_{el}(E, L)$ | *:* Mapping from logical edges to physical links |
| $M_{fl}(F, L)$ | *:* Mapping from logical links to physical links |
| $M_{wx}(W, X)$ | 1:1 Mapping from logical fast links to physical fast links |

Table 6, below, includes exemplary constraints of a logical mapping of a subgraph and a physical device array that are used by placer 124 for assigning operations to the physical resources. Constants and variables of Tables 4 and 5, respectively, are used to formulate and/or otherwise define the constraints of Table 6 as shown below.

TABLE 6

| Constraint Description | Formula |
| --- | --- |
| Map logical vertices to target nodes 1:1 | $\forall v. \sum_{n} M_{vn}(v, n) = 1$ |
| | $\forall n. \sum_{v} M_{vn}(v, n) \leq 1$ |
| Map logical inputs to physical inputs *:1 | $\forall i. \sum_{i} M_{ij}(i, j) = 1$ |
| Map logical outputs to physical outputs *:1 | $\forall o. \sum_{p} M_{op}(o, p) = 1$ |
| Map logical cascade links to physical cascade links 1:1 | $\forall w. \sum_{x} M_{wx}(w, x) = 1$ |
| | $\forall x. \sum_{w} M_{wx}(o, p) \leq 1$ |
| For any outgoing logical link f from logical vertex v and target node n, if v is mapped to n, exactly one output link from n is used for f | $\forall v, f, n \mid G(v, f). \sum_{l \mid H(n,l)} M_{fl}(f, l) = M_{vn}(v, n)$ |
| For any outgoing logical link f from logical input i and physical input j, if i is mapped to j, exactly one output link from j is used for f | $\forall i, f, j \mid G(i, f). \sum_{l \mid H(n,l)} M_{fl}(f, l) = M_{ij}(i, j)$ |
| For any logical link f and target node n, if f's destination maps to n, then fuses one hardware link to enter n | $\forall f, n. \sum_{l \mid H(l,n)} M_{fl}(f, l) = \sum_{v} M_{vn}(v, n)$ |
| For any logical link f and physical output p, iff's destination maps to p, then f uses one hardware link to enter p | $\forall f, p. \sum_{l \mid H(l,n)} M_{fl}(f, l) = \sum_{o} M_{op}(o, p)$ |
| If a logical link enters a router by some physical link, it must leave by exactly one physical link | $\forall f, r. \sum_{l \mid H(l,r)} M_{fl}(f, l) = \sum_{l \mid H(r,l)} M_{fl}(f, l)$ |
| A logical edge is mapped to a physical link if and only if one or more of its logical links are mapped to that physical link | $\forall$f, l. $M_{el}$(e, l) = $\max_{f \in e} M_{fl}$(f, l) (encoded with two summations) |
| Ensure that the sum of bandwidth needed by the edges routing through link/do not exceed the capacity of link l | $\forall l. \sum_{e} M_{el}(e, l) * Bw(e) \leq Cap(l)$ |
| Ensure the sum of the number of links mapped to a given physical link does not exceed its limit | $\forall l. \sum_{e} M_{el}(e, l) \leq \text{Lim}(l)$ |
| If a logical cascade link w maps to physical cascade link x, then the source of x must be in the possible sources for w | $\forall$w, x, v\|H(v, x). $M_{wx}$(w, x) = $M_{vn}$ ($C_s$(w), n) |
| If a logical cascade link w maps to physical cascade link x, then the destination of x must be in the possible destinations for w | $\forall w, x, v \mid H(x, v). M_{wx}(w, x) = \sum_{v \in C_d(w)} M_{vn}(v, n)$ |

In some examples, using the above constants, variables, and constraints, the placer is configured to use optimization metrics that minimize the network traffic across PEs using the hop-byte metric. The total number of bytes traversing logical edges is summed and that value is minimized using the described ILP-based technique. The hop-bytes metric serves as a good proxy for communication cost. Equation 5, below, is an example of such a minimization function where T(e) is equal to total bytes traversing a logical edge e.

$$\forall\, l \cdot \min\left[\sum_e \sum_l M_{el}(e, l) * T(e)\right] \quad (5)$$

Alternatively, or additionally, other optimization metrics are used to optimize the placement of logical mappings onto physical resources by the placer as described herein. For example, optimization of hops, average network latency, and/or execution latency can also be used. Equation 6, below, is an example of a hops-based minimization function; the equation 7, below, is an example of an average network latency minimization function where BW(l) is the bandwidth of the physical link l; and Equation 8, below, is an example of an execution latency minimization function where W (σ(e)) is the path criticality of the logical edge e. The execution latency metric serves as an accurate proxy for communication by considering the physical link bandwidths and the path criticality of each logical edge by summing the compute costs leading up to that edge. These various optimization metrics can be used alone or can be combined for an even more accurate proxy of communication cost at the expense of longer solve times.

$$\forall\, l \cdot \min\left[\sum_e \sum_l M_{el}(e, l)\right] \quad (6)$$

$$\forall\, l \cdot \min\left[\sum_e \sum_l \frac{M_{el}(e, l) * T(e)}{BW(l)}\right] \quad (7)$$

$$\forall\, l \cdot \min\left[\sum_e \sum_l \frac{M_{el}(e, l) * T(e) * W(\sigma(e))}{BW(l)}\right] \quad (8)$$

In some examples, the operation of placer 124 is improved using one or more optimization strategies. In such examples, placer 124 is configured to use placement hints, to solve placement with hierarchical routing, to solve placement using Place-Then-Route techniques, and/or to solve placement using Blocked Placement techniques.

The use of placement hints includes enforcing certain placement shapes, positions, and/or patterns based on placement information provided by experts. Such placement information informs placer 124 where logical PEs in a cascade chain or communication ring should be placed relative to each other to make the placement problem easier to solve.

The use of hierarchical routing includes first solving the placement problem with coarse-grained routing and then expanding to the full problem using the obtained coarse-grained routing solution information. Coarse-grained routing includes grouping routers of the system by some tunable groups or tiling factors to simplify the routing and reduce the size of the initial problem.

The use of Place-Then-Route techniques includes initially solving the placement of PEs and cascade links and then solving routing based on those initial solutions. In some examples, such techniques include solving the placement of PEs and cascade links as a first ILP problem and solving routing as a second ILP problem to trade quality for solver performance.

The use of Blocked Placement techniques includes blocking both input and target graphs into larger structures to make placement more tractable. After solving placement with the blocked elements, that solution can be used to solve the full problem.

Figure 6:
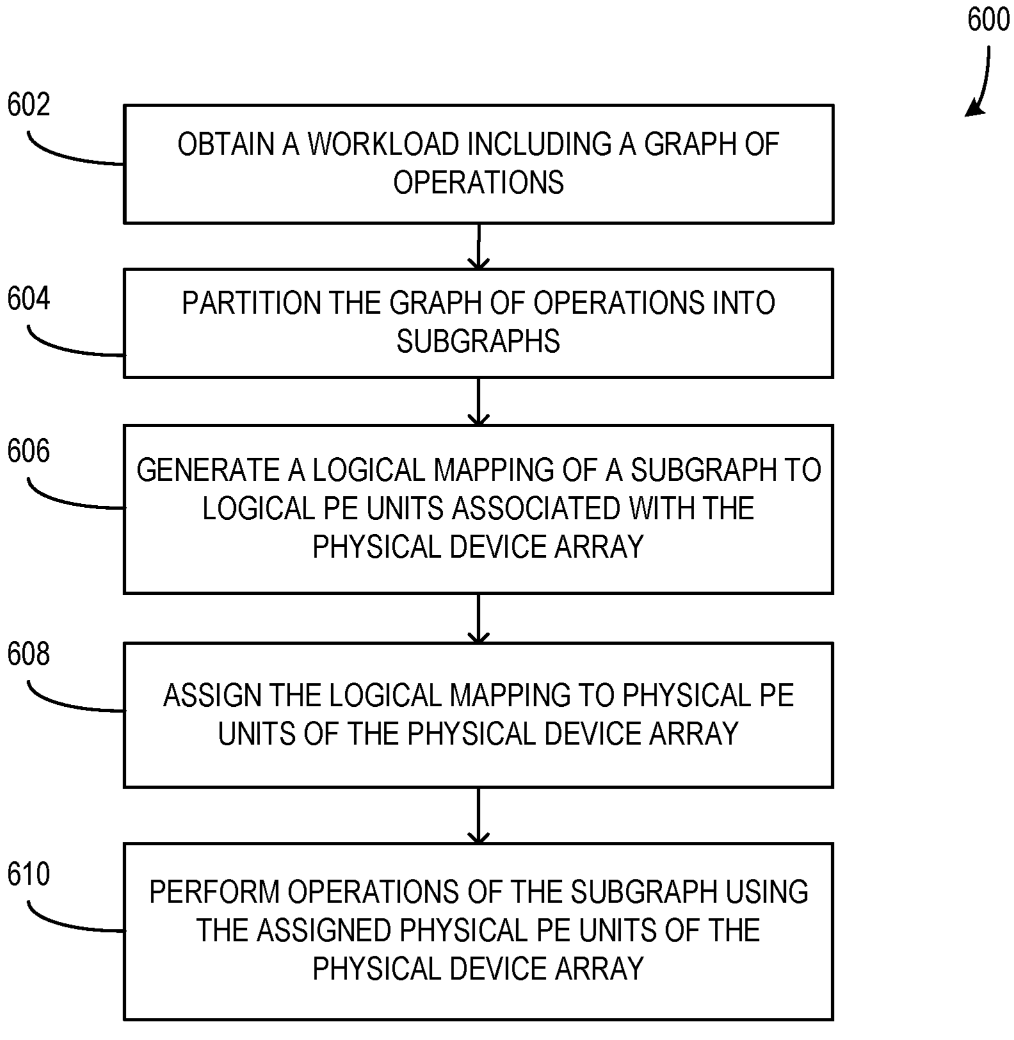
FIG. 6 is a flowchart illustrating a computerized method for placing and performing a workload on a physical device array.

FIG. 6 is a flowchart illustrating a computerized method 600 for placing and performing a workload (e.g., workload 102) on a physical device array (e.g., physical device array 126). In some examples, method 600 is executed or otherwise performed in a system such as systems 100 and/or 200 of FIGS. 1 and/or 2, respectively.

At 602, a workload that includes a graph of operations (e.g., graph 104 of operations) is obtained. In some examples, the workload is provided to resource mapping platform 110 to be partitioned, mapped, and placed on physical resources (e.g., physical resources 128-130) of the physical device array. Further, in some examples, the workload is a deep learning AI workload or another type of AI workload.

At 604, the graph of operations is partitioned into subgraphs (e.g., subgraphs 114-116). In some examples, the partitioning is performed by partitioner 112 of resource mapping platform 110 as described herein. Further, in some examples, the graph is partitioned into subgraphs that each are configured to fit on a single device of the physical device array. Additionally, or alternatively, the graph is partitioned into subgraphs using constants, variables, and/or constraints that limit and/or optimize a metric about the partitions. For example, partitioning is configured to minimize the quantity of subgraphs that are generated while still ensuring that each subgraph can be executed on a single device of the physical device array.

In some examples, the partitioning of the graph of operations into subgraphs includes using ILP techniques to minimize the quantity of subgraphs while constrained by one or more of the following constraints: a constraint that every operation of the graph of operations be assigned to one subgraph: a constraint that every subgraph is continuous: a maximum quantity of PEs constraint: a maximum quantity of memory constraint; and a maximum quantity of bandwidth constraint.

At 606, a logical mapping (e.g., logical mapping 122) of a subgraph to logical PE units (e.g., logical PE units 120) is generated. In some examples, the generation of the logical mapping is performed by a mapper 118 of resource mapping platform 110 as described herein. Further, in some examples, the logical PE units are representative of physical resources of the physical device array. Additionally, or alternatively, in some examples, the generation of the logical mapping includes analyzing operations of the subgraph using Einsum notation as described above. During such analyses, tiling factors for dimensions of the operations are searched using limiting constraints and tiling factors are selected. Those tiling factors are used to generate the logical mapping as described herein.

At 608, the logical mapping is assigned to physical PE units (e.g., physical resources 128-130) of the physical device array. In some examples, the assignment of the logical mapping is performed by placer 124 of resource mapping platform 110 as described herein. Further, in some examples, the assignment or placement of the logical mapping to the physical PE units is based on constants, variables, and/or constraints as described above. Additionally, or alternatively, the placement of the logical mapping on physical PE units and/or other physical resources of the physical device array includes determining how to place operations on the physical resources using optimization metrics, such as minimizing hop-bytes, minimizing hops, minimizing average latency, and/or minimizing execution latency, as described herein.

In some examples, assigning the logical mapping of the subgraph to physical PE units of the physical device array includes using ILP to minimize network traffic across physical PE units while constrained by one or more of the following constraints: a constraint requiring logical vertices of the logical mapping to be mapped to physical nodes of the physical device array: a constraint requiring logical inputs of the logical mapping to be mapped to physical inputs of the physical device array: a constraint requiring logical outputs of the logical mapping to be mapped to physical outputs of the physical device array: a constraint requiring logical links of the logical mapping to be mapped to physical links of the physical device array; and a constraint requiring logical cascade links of the logical mapping to be mapped to physical cascade links of the physical device array.

Further, in some examples, assigning the logical mapping of the subgraph to physical PE units of the physical device array includes using hierarchical routing. Such techniques include solving a coarse-grained routing problem associated with the logical mapping and applying placement and routing constraints to a fine-grained assignment problem associated with the logical mapping using the solved coarse-grained routing problem. The fine-grained assignment problem is then solved using the applied placement and routing constraints and the logical mapping is assigned to the physical PE units using the solution of the solved fine-grained assignment problem.

Additionally, or alternatively, in some examples, assigning the logical mapping to physical PE units includes using Place-Then-Route techniques. Such techniques include first solving an assignment problem associated with the logical mapping including assignment of portions of the logical mapping to at least one of physical PE units and cascade links. Placement constraints are obtained by solving the assignment problem and those placement constraints are applied to a routing problem associated with the logical mapping. The routing problem is then solved using the applied placement constraints and the logical mapping is assigned to the physical PE units using solutions of the solved assignment problem and the solved routing problem.

Still further, in some examples, assigning the logical mapping to physical PE units includes using Blocked Placement techniques. Such techniques include combining portions of the logical mapping into block structures. A first assignment problem associated with these larger block structures is then solved, including assigning the block structures to physical PE units and/or other physical resources of the physical device array. Placement constraints are obtained by solving the first assignment problem and those placement constraints are applied to a second assignment problem associated with the logical mapping at its full granularity. For example, the second assignment problem requires placement of individual operations of the logical mapping to be determined rather than placement of block structures of multiple operations. The second assignment problem is solved using the applied placement constraints and the logical mapping is assigned to the physical PE units using a solution of the solved second assignment problem. The use of the block structures makes the initial assignment problem less complex and more tractable as described herein.

At 610, the operations of the subgraph are performed using the assigned physical PE units of the physical device array. In some examples, method 600 includes generating a logical mapping for each subgraph of the graph of operations and then assigning each logical mapping to physical PE units of the physical device array. In such examples, the operations of each subgraph of the graph of operations are performed on the assigned physical PE units as described herein. Further, it should be understood that the operations of the subgraphs are organized spatially (e.g., multiple operations assigned to different physical resources to be performed at the same time) and temporally (e.g., multiple operations assigned to the same physical resources to be performed at different times).

Exemplary Operating Environment

Figure 7:
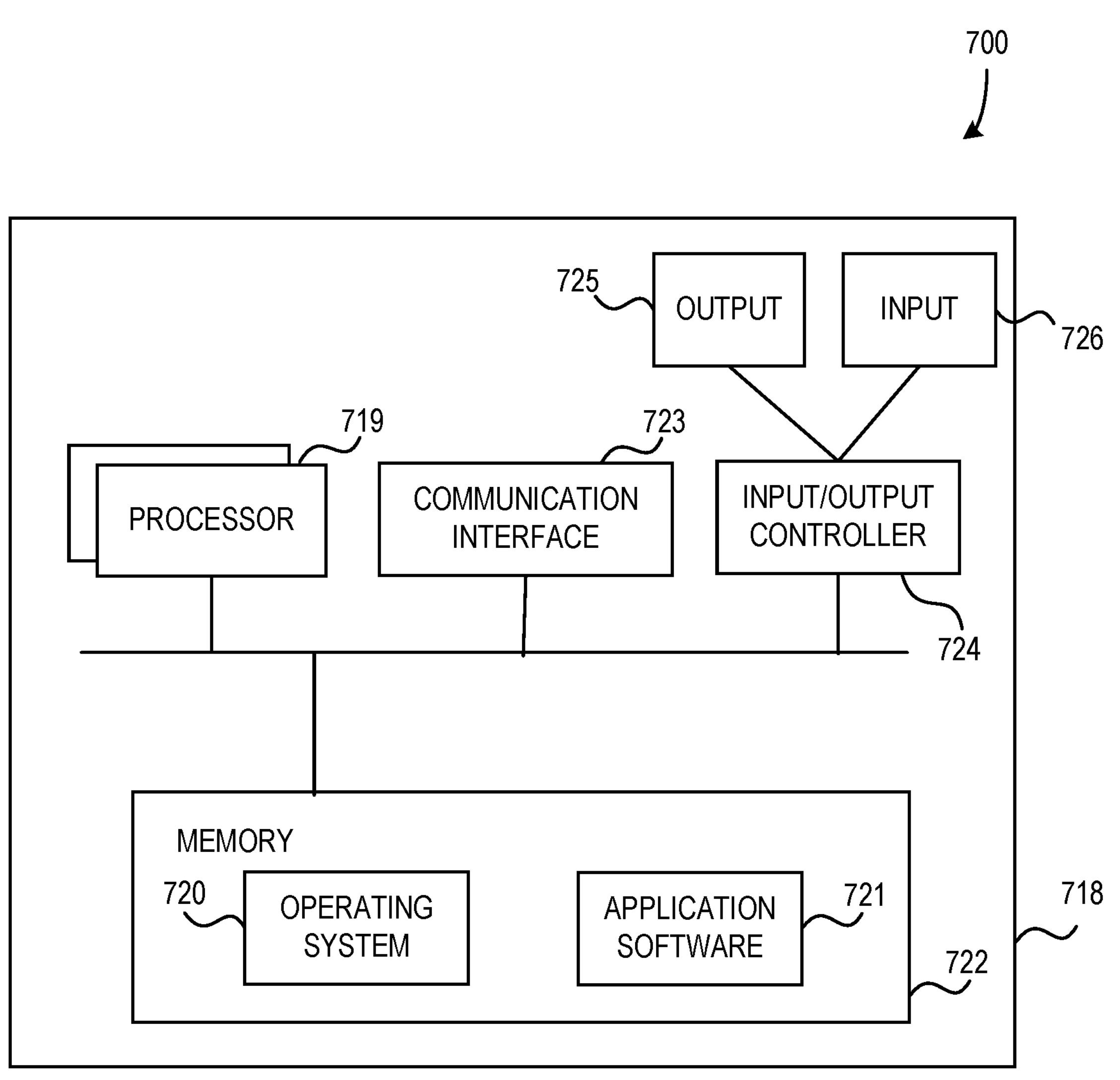
FIG. 7 illustrates an example computing apparatus as a functional block diagram.

The present disclosure is operable with a computing apparatus according to an embodiment as a functional block diagram 700 in FIG. 7. In an example, components of a computing apparatus 718 are implemented as a part of an electronic device according to one or more embodiments described in this specification. Computing apparatus 718 comprises one or more processors 719 which may be microprocessors, controllers, or any other suitable type of processors for processing computer executable instructions to control the operation of the electronic device. Alternatively, or in addition, processor 719 is any technology capable of executing logic or instructions, such as a hard-coded machine. In some examples, platform software comprising an operating system 720 or any other suitable platform software is provided on apparatus 718 to enable application software 721 to be executed on the device. In some examples, assigning operations of a workload to physical resources of a physical device array and performing those assigned operations as described herein is accomplished by software, hardware, and/or firmware.

In some examples, computer executable instructions are provided using any computer-readable media that are accessible by computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology. Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (memory 722) is shown within computing apparatus 718, it will be appreciated by a person skilled in the art, that, in some examples, the storage is distributed or located remotely and accessed via a network or other communication link (e.g., using a communication interface 723).

Further, in some examples, computing apparatus 718 comprises an input/output controller 724 configured to output information to one or more output devices 725, for example a display or a speaker, which are separate from or integral to the electronic device. Additionally, or alternatively, input/output controller 724 is configured to receive and process an input from one or more input devices 726, for example, a keyboard, a microphone, or a touchpad. In one example, output device 725 also acts as the input device. An example of such a device is a touch sensitive display. Input/output controller 724 may also output data to devices other than the output device, e.g., a locally connected printing device. In some examples, a user provides input to input device(s) 726 and/or receives output from output device(s) 725.

The functionality described herein can be performed, at least in part, by one or more hardware logic components. According to an embodiment, computing apparatus 718 is configured by the program code when executed by processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to, with the processor, cause the processor to: obtain a workload including a graph of operations to be performed on a physical device array: partition the graph of operations into subgraphs at least by minimizing a quantity of subgraphs and maximizing resource utilization per subgraph; generate a logical mapping of a subgraph of the subgraphs to logical processing engine (PE) units associated with a logical structure of the physical device array using features of the subgraph and tiling factors of the logical PE units: assign the logical mapping of the subgraph to physical PE units of the physical device array at least by minimizing network traffic across the physical PE units of the physical device array; and perform operations of the subgraph using the physical PE units of the physical device array to which the logical mapping is assigned.

An example computerized method comprises: obtaining a workload including a graph of operations to be performed on a physical device array: partitioning the graph of operations into subgraphs at least by minimizing a quantity of subgraphs and maximizing resource utilization per subgraph, wherein each subgraph is sized to be executed using one device of the physical device array: generating a logical mapping of a subgraph of the subgraphs to logical processing engine (PE) units associated with a logical structure of the physical device array using features of the subgraph and tiling factors of the logical PE units; assigning the logical mapping of the subgraph to physical PE units of the physical device array at least by minimizing network traffic across the physical PE units of the physical device array: and performing operations of the subgraph using the physical PE units of the physical device array to which the logical mapping is assigned.

One or more computer storage media having computer-executable instructions that, upon execution by a processor, cause the processor to at least: obtain a deep learning artificial intelligence (AI) workload including a graph of operations to be performed on a physical device array: partition the graph of operations into subgraphs at least by minimizing a quantity of subgraphs and maximizing resource utilization per subgraph: generate a logical mapping of a subgraph of the subgraphs to logical processing engine (PE) units associated with a logical structure of the physical device array using features of the subgraph and tiling factors of the logical PE units: assign the logical mapping of the subgraph to physical PE units of the physical device array at least by minimizing network traffic across the physical PE units of the physical device array; and perform operations of the subgraph using the physical PE units of the physical device array to which the logical mapping is assigned.

Alternatively, or in addition to the other examples described herein, examples include any combination of the following:

- wherein partitioning the graph of operations into subgraphs includes minimizing a quantity of partitioned subgraphs while constrained by at least one of the following constraints: a constraint that every operation of the graph of operations is assigned to one subgraph: a constraint that every subgraph is continuous: a maximum quantity of PEs constraint: a maximum quantity of memory constraint; and a maximum quantity of bandwidth constraint.
- wherein generating the logical mapping of the subgraphs to the logical PE units includes: identifying constraints of operations of the subgraphs using a summation notation analysis: searching tiling factors for dimensions of the analyzed operations using the identified constraints of the analyzed operations to limit the search; selecting a tiling factor of the searched tiling factors for use with an analyzed operation; and generating the logical mapping using the selected tiling factor.—wherein assigning the logical mapping of the subgraphs to the physical PE units includes minimizing network traffic across the physical PE units while constrained by at least one of the following constraints: a constraint requiring logical vertices of the logical mapping to be mapped to physical nodes of the physical device array: a constraint requiring logical inputs of the logical mapping to be mapped to physical inputs of the physical device array: a constraint requiring logical outputs of the logical mapping to be mapped to physical outputs of the physical device array: a constraint requiring logical links of the logical mapping to be mapped to physical links of the physical device array; and a constraint requiring logical cascade links of the logical mapping to be mapped to physical cascade links of the physical device array.
- wherein partitioning the graph of operations into subgraphs includes partitioning the graph of operations into subgraphs at least by sizing each of the subgraphs to be executed using one device of the physical device array.
- wherein assigning the logical mapping of the subgraph to physical PE units of the physical device array includes assigning the logical mapping of the subgraph to physical PE units of the physical device array at least by: solving a coarse-grained routing problem associated with the logical mapping: applying placement and routing constraints to a fine-grained assignment problem associated with the logical mapping using the solved coarse-grained routing problem: solving the fine-grained assignment problem associated with the logical mapping using the applied placement and routing constraints; and assigning the logical mapping to the physical PE units using a solution of the solved fine-grained assignment problem.
- wherein the workload is a deep learning artificial intelligence (AI) workload.
- wherein assigning the logical mapping of the subgraph to physical PE units of the physical device array includes assigning the logical mapping of the subgraph to physical PE units of the physical device array at least by: solving an assignment problem associated with the logical mapping including assignment of portions of the logical mapping to at least one of physical PE units and cascade links: applying placement constraints to a routing problem associated with the logical mapping using the solved assignment problem: solving the routing problem associated with the logical mapping using the applied placement constraints; and assigning the logical mapping to the physical PE units using solutions of the solved assignment problem and the solved routing problem.
- wherein assigning the logical mapping of the subgraph to physical PE units of the physical device array includes assigning the logical mapping of the subgraph to physical PE units of the physical device array at least by: combining portions of the logical mapping into block structures: solving a first assignment problem associated with the block structures including assigning the block structures to physical PE units: applying placement constraints to a second assignment problem associated with the logical mapping using the solved first assignment problem associated with the block structures: solving the second assignment problem associated with the logical mapping using the applied placement constraints; and assigning the logical mapping to the physical PE units using a solution of the solved second assignment problem.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining a workload including a graph of operations to be performed on a physical device array: exemplary means for partitioning the graph of operations into subgraphs at least by minimizing a quantity of subgraphs and maximizing resource utilization per subgraph: exemplary means for generating a logical mapping of a subgraph of the subgraphs to logical processing engine (PE) units associated with a logical structure of the physical device array using features of the subgraph and tiling factors of the logical PE units; exemplary means for assigning the logical mapping of the subgraph to physical PE units of the physical device array at least by minimizing network traffic across the physical PE units of the physical device array; and exemplary means for performing operations of the subgraph using the physical PE units of the physical device array to which the logical mapping is assigned.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a memory comprising computer program code, the memory and the computer program code configured to cause the processor to:

obtain a workload including a graph of operations to be performed on a physical device array, the physical device array having logical processing engine (PE) units associated therewith;

partition the graph of operations into subgraphs using integer linear programming (ILP) to minimize a quantity of the subgraphs while maximizing resource utilization per subgraph under a constraint of resources available per device of the physical device array, wherein each subgraph is sized to be executed using a device of the physical device array;

identify constraints of operations of the subgraphs using a summation notation analysis which determines that the operations of the subgraphs are mappable to the same logical PE units;

search tiling factors for dimensions of the operations of the subgraphs using the identified constraints, the tiling factors comprising a block size of data;

select a tiling factor of the searched tiling factors;

generate a logical mapping of a subgraph of the subgraphs to the logical PE units associated with a logical structure of the physical device array using the tiling factor;

assign, using the ILP, the logical mapping of the subgraph to physical PE units of the physical device array at least by minimizing network traffic across the physical PE units; and perform the operations of the subgraph using the physical PE units to which the logical mapping is assigned.

2. The system of claim 1, wherein partitioning the graph of operations into subgraphs includes minimizing the quantity of subgraphs while constrained by one or more of the following constraints: a first constraint that every operation of the graph of operations is assigned to one subgraph, a second constraint that every subgraph is continuous, a maximum quantity of PEs constraint, a maximum quantity of memory constraint, and a maximum quantity of bandwidth constraint.

3. The system of claim 1, wherein the summation notation analysis comprises using an Einstein Summation (Einsum) notation.

4. The system of claim 1, wherein assigning the logical mapping of the subgraph to the physical PE units includes minimizing network traffic across the physical PE units while constrained by one or more of the following constraints:

a first constraint requiring logical vertices of the logical mapping to be mapped to physical nodes of the physical device array;

a second constraint requiring logical inputs of the logical mapping to be mapped to physical inputs of the physical device array;

a third constraint requiring logical outputs of the logical mapping to be mapped to physical outputs of the physical device array;

a fourth constraint requiring logical links of the logical mapping to be mapped to physical links of the physical device array; and a fifth constraint requiring logical cascade links of the logical mapping to be mapped to physical cascade links of the physical device array.

5. The system of claim 1, wherein a graph profile of the graph of operations, an architecture description describing features of the physical device array, and a latency target are used as input for the partitioning, the generating, and the assigning.

6. The system of claim 1, wherein assigning the logical mapping of the subgraph to the physical PE units is performed by:

solving a coarse-grained routing problem associated with the logical mapping;

applying placement and routing constraints to a fine-grained assignment problem associated with the logical mapping using the solved coarse-grained routing problem;

solving the fine-grained assignment problem associated with the logical mapping using the applied placement and routing constraints; and assigning the logical mapping to the physical PE units using a solution of the solved fine-grained assignment problem.

7. The system of claim 1, wherein the workload is a deep learning artificial intelligence (AI) workload.

8. A computerized method comprising:

obtaining a workload including a graph of operations to be performed on a physical device array;

partitioning the graph of operations into subgraphs using integer linear programming (ILP) to minimize a quantity of the subgraphs while maximizing resource utilization per subgraph under a constraint of resources available per device of the physical device array, wherein each of the subgraphs is sized to be executed using one device of the physical device array;

identifying constraints of operations of the subgraphs using a summation notation analysis which determines that the operations of the subgraphs are mappable to the same logical PE units;

searching tiling factors for dimensions of the operations of the subgraphs using the identified constraints, the tiling factors comprising a block size of data;

selecting a tiling factor of the searched tiling factors;

generating a logical mapping of a subgraph of the subgraphs to logical processing engine (PE) units associated with a logical structure of the physical device array using the tiling factor;

assigning the logical mapping of the subgraph to physical PE units of the physical device array at least by minimizing network traffic across the physical PE units; and performing the operations of the subgraph using the physical PE units to which the logical mapping is assigned.

9. The computerized method of claim 8, wherein partitioning the graph of operations into subgraphs includes minimizing the quantity of subgraphs while constrained by one or more of the following constraints: a first constraint that every operation of the graph of operations is assigned to one subgraph, a second constraint that every subgraph is continuous, a maximum quantity of PEs constraint, a maximum quantity of memory constraint, and a maximum quantity of bandwidth constraint.

10. The computerized method of claim 8, wherein the summation notation analysis comprises using an Einstein Summation (Einsum) notation.

11. The computerized method of claim 8, wherein assigning the logical mapping of the subgraph to the physical PE units includes minimizing network traffic across the physical PEs while constrained by one or more of the following constraints:

a first constraint requiring logical vertices of the logical mapping to be mapped to physical nodes of the physical device array;

a second constraint requiring logical inputs of the logical mapping to be mapped to physical inputs of the physical device array;

a third constraint requiring logical outputs of the logical mapping to be mapped to physical outputs of the physical device array;

a fourth constraint requiring logical links of the logical mapping to be mapped to physical links of the physical device array; and a fifth constraint requiring logical cascade links of the logical mapping to be mapped to physical cascade links of the physical device array.

12. The computerized method of claim 8, wherein assigning the logical mapping of the subgraph to the physical PE units is performed by:

solving an assignment problem associated with the logical mapping including assignment of portions of the logical mapping to at least one of physical PE units and cascade links;

applying placement constraints to a routing problem associated with the logical mapping using the solved assignment problem;

solving the routing problem associated with the logical mapping using the applied placement constraints; and assigning the logical mapping to the physical PE units using solutions of the solved assignment problem and the solved routing problem.

13. The computerized method of claim 8, wherein assigning the logical mapping of the subgraph to physical PE units is performed by:

solving a coarse-grained routing problem associated with the logical mapping;

applying placement and routing constraints to a fine-grained assignment problem associated with the logical mapping using the solved coarse-grained routing problem;

solving the fine-grained assignment problem associated with the logical mapping using the applied placement and routing constraints; and assigning the logical mapping to the physical PE units using a solution of the solved fine-grained assignment problem.

14. The computerized method of claim 8, wherein the workload is a deep learning artificial intelligence (AI) workload.

15. A computer storage medium having computer-executable instructions that, upon execution by a processor, cause the processor to at least:

obtain a deep learning artificial intelligence (AI) workload including a graph of operations to be performed on a physical device array;

partition the graph of operations into subgraphs using integer linear programming (ILP) to minimize a quantity of the subgraphs while maximizing resource utilization per subgraph under a constraint of resources available per device of the physical device array, wherein each subgraph is sized to be executed using a single device of the physical device array;

identify constraints of operations of the subgraphs using a summation notation analysis which determines that the operations of the subgraphs are mappable to the same logical PE units;

search tiling factors for dimensions of the operations of the subgraphs using the identified constraints, the tiling factors comprising a block size of data;

select a tiling factor of the searched tiling factors;

generate a logical mapping of a subgraph of the subgraphs to logical processing engine (PE) units associated with a logical structure of the physical device array, using the tiling factor and features of the subgraphs;

assign the logical mapping of the subgraph to physical PE units of the physical device array at least by minimizing network traffic across the physical PE units; and perform the operations of the subgraph using the physical PE units to which the logical mapping is assigned.

16. The computer storage medium of claim 15, wherein partitioning the graph of operations into subgraphs includes minimizing the quantity of subgraphs while constrained by one or more of the following constraints, a first constraint that every operation of the graph of operations is assigned to one subgraph, a second constraint that every subgraph is continuous, a maximum quantity of PEs constraint, a maximum quantity of memory constraint, and a maximum quantity of bandwidth constraint.

17. The computer storage medium of claim 15, wherein the summation notation analysis comprises using an Einstein Summation (Einsum) notation.

18. The computer storage medium of claim 15, wherein assigning the logical mapping of the subgraph to physical PE units includes minimizing network traffic across the physical PE units while constrained by one or more of the following constraints:

a first constraint requiring logical vertices of the logical mapping to be mapped to physical nodes of the physical device array;

a second constraint requiring logical inputs of the logical mapping to be mapped to physical inputs of the physical device array;

a third constraint requiring logical outputs of the logical mapping to be mapped to physical outputs of the physical device array;

a fourth constraint requiring logical links of the logical mapping to be mapped to physical links of the physical device array; and a fifth constraint requiring logical cascade links of the logical mapping to be mapped to physical cascade links of the physical device array.

19. The computer storage medium of claim 15, wherein partitioning the graph of operations into subgraphs includes determining where to place boundaries between the subgraphs in the graph such that each of the subgraphs is executed as a single instance using one device of the physical device array.

20. The computer storage medium of claim 15, wherein assigning the logical mapping of the subgraph to the physical PE units is performed by:

combining portions of the logical mapping into block structures;

solving a first assignment problem associated with the block structures including assigning the block structures to the physical PE units;

applying placement constraints to a second assignment problem associated with the logical mapping using the solved first assignment problem associated with the block structures;

solving the second assignment problem associated with the logical mapping using the applied placement constraints; and assigning the logical mapping to the physical PE units using a solution of the solved second assignment problem.

* * * * *